United States Patent
Katsuyama

(10) Patent No.: US 7,362,327 B2
(45) Date of Patent: Apr. 22, 2008

(54) METHOD FOR DRAWING OBJECT THAT CHANGES TRANSPARENCY

(75) Inventor: Futoshi Katsuyama, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 503 days.

(21) Appl. No.: 10/989,281

(22) Filed: Nov. 17, 2004

(65) Prior Publication Data

US 2005/0140671 A1 Jun. 30, 2005

(30) Foreign Application Priority Data

Nov. 18, 2003 (JP) ............................ P2003-388375

(51) Int. Cl.
*G06T 15/40* (2006.01)

(52) U.S. Cl. ...................... 345/422; 345/419; 345/421; 345/427; 345/589; 345/592

(58) Field of Classification Search ................ 345/422, 345/592, 419, 421, 427, 589, 607
See application file for complete search history.

(56) References Cited

U.S. PATENT DOCUMENTS 6,561,907 B2    5/2003  Shimizu et al.
7,030,887 B2 *  4/2006  Andrews ..................... 345/592

FOREIGN PATENT DOCUMENTS

JP      2001-224846         8/2001

OTHER PUBLICATIONS

English language Abstract of JP2001-224846.
McMormick et al., "The Deferred Accumulation Buffer," Journal of Graphics Tools, Association for Computing Machinery, vol. 4, No. 3, pp. 35-46 (1999) XP001024724.

* cited by examiner

*Primary Examiner*—Kimbinh T. Nguyen
(74) *Attorney, Agent, or Firm*—Greenblum & Bernstein, P.L.C.

(57) ABSTRACT

In a process where an object fades-in/fades-out, a rate of transparency change is set. A writing threshold is obtained according to the rate of change of the transparency of the object. Polygons included in the object are sequentially processed, and an α value of the processed polygon is obtained according to the rate of change of the transparency. When a Z value of the polygon is smaller than that registered in a Z-buffer, the polygon is drawn in a frame buffer. The Z value of the polygon is written to the Z-buffer only when the current α value is larger than the threshold. When a Z value of the polygon is larger than that registered in the Z-buffer, the polygon is not drawn in the frame buffer.

25 Claims, 7 Drawing Sheets

RATE OF CHANGE 100%
⇩
THRESHOLD 60

RATE OF CHANGE 80%
⇩
THRESHOLD 60

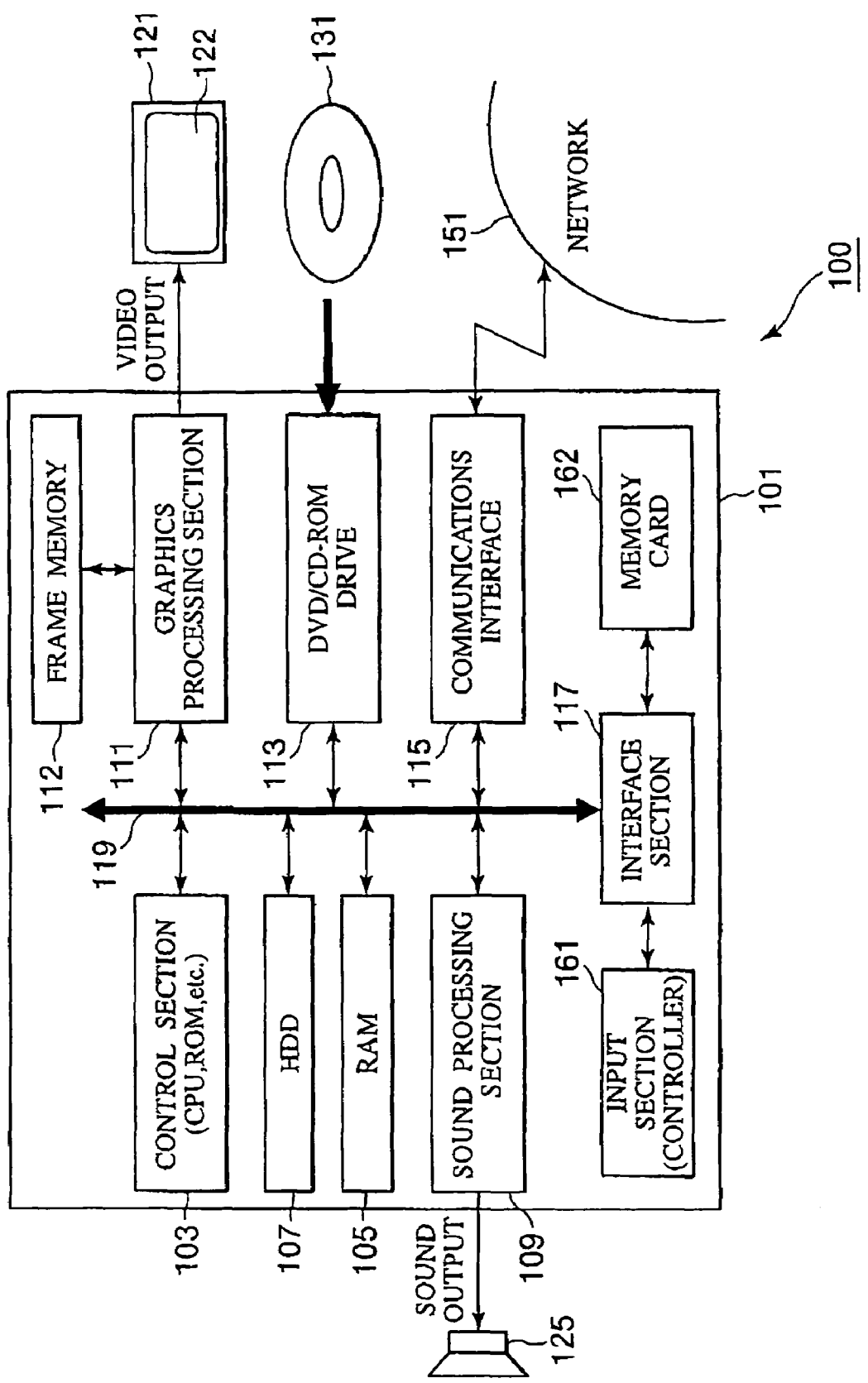

FIG.5

```
                                  ┌─ 400
                                  ├─ 401
OBJECT ID
POLYGON IDENTIFICATION NO.        ─ 411a  ┐
COORDINATES OF VERTEX 1                   │
COORDINATES OF VERTEX 2                   ├ 411
COORDINATES OF VERTEX 3           ─ 411b  │
COORDINATES OF VERTEX 4                   ┘
TEXTURE NO.                       ─ 412a  ┐
UV COORDINATES (VERTEX 1)                 │
UV COORDINATES (VERTEX 2)                 ├ 412
UV COORDINATES (VERTEX 3)         ─ 412b  │
UV COORDINATES (VERTEX 4)                 ┘
POLYGON IDENTIFICATION NO.        ─ 421a  ┐
COORDINATES OF VERTEX 1                   │
COORDINATES OF VERTEX 2                   ├ 421
COORDINATES OF VERTEX 3           ─ 421b  │
COORDINATES OF VERTEX 4                   ┘
TEXTURE NO.                       ─ 422a  ┐
UV COORDINATES (VERTEX 1)                 │
UV COORDINATES (VERTEX 2)                 ├ 422
UV COORDINATES (VERTEX 3)         ─ 422b  │
UV COORDINATES (VERTEX 4)                 ┘
```

FIG.6

```
                        ┌─ 500
TEXTURE NO.             ─ 501
UV COORDINATES 1        ─ 511  ┐
RGB                     ─ 512  ├ 510
VALUE α                 ─ 513  ┘
UV COORDINATES 2        ─ 521  ┐
RGB                     ─ 522  ├ 520
VALUE α                 ─ 523  ┘
```

FIG.7

| | | EXAMPLE 1 | EXAMPLE 2 | EXAMPLE 3 |
|---|---|---|---|---|
| OBJECT ID | 601 | 1 | 2 | 3 |
| KIND OF CHANGE | 602 | FADE-OUT | FADE-IN | |
| RATE OF CHANGE OF VALUE α(%) | 603 | 80 | 20 | 100 |
| DISPLAY POSITION | 604 | X1,Y1,Z1 | X2,Y2,Z2 | X3,Y3,Z3 |

(600)

METHOD FOR DRAWING OBJECT THAT CHANGES TRANSPARENCY

CROSS REFERENCE TO RELATED APPLICATION

The present disclosure relates to subject matter contained in Japanese Patent Application No. 2003-388375, filed on Nov. 18, 2003, the disclosure of which is expressly incorporated herein by reference in its entirety.

BACKGROUND OF THE INVENTION

1. Field of the Invention

The present invention relates to an image drawing apparatus and method, and particularly to image processing using a Z-buffer method for drawing an object whose transparency changes.

2. Description of the Related Art

In the conventional video game, when an object including multiples polygons is faded-in/faded-out from a screen in accordance with the progress of the game, transparency of polygons that form the object is changed. Unexamined Japanese Patent Publication No. 2001-224846 discloses a method for drawing an object in the case where the transparency of multiple polygons is changed concurrently.

In the case where the object including the multiple polygons is drawn, a Z-buffer method is widely used to carry out a hidden surface removal for displaying the polygon as an image. An α value indicating transparency (it is assumed that the smaller the value is, the higher the transparency becomes in this case) is set to the polygon. In the conventional Z-buffer method, whether a Z value of a polygon placed at a front side overlapping with a polygon placed at a back side is written to a Z-buffer is decided according to a preset writing threshold.

FIGS. 1A to 1D are views each explaining an example of processing according to the conventional Z-buffer method. As illustrated in FIGS. 1A and 1B, it is assumed that a polygon group 701 whose α value is 70 is placed at the front side which is close to the position of the viewpoint and a polygon group 702 whose α value is 80 is placed at the back side which is fax from the position of the viewpoint. The transparency of the polygons 701 and 702 included in the object is changed simultaneously. The α value, which is obtained when the transparency of the polygons 701 and 702 is changed, is hereinafter referred to as a current α value to be distinguished from the originally set α value. It is assumed that the writing threshold is 60.

When the transparency of the object is unchanged, for example, before starting fade-in and after completing fade-out, a rate of change of transparency is set to 100%. When the object becomes completely transparent, for example, before ending fade-out and after starting fade-in, the rate of change of transparency is set to 0%. When the transparency of the object is unchanged, namely, the rate of change of transparency is set to 100%, a current α value of the polygon group 701 is 70×100/100=70 and a current α value of the polygon group 702 is 80×100/100=80.

In the case where the transparency of the object is unchanged, namely, the rate of change of transparency is set to 100%, when the polygon group 701 placed at the front side is first processed, the α value of the polygon group 701 is higher than the writing threshold. As a result, the Z value of the polygon group 701 is written to the Z-buffer and the polygon group 701 is drawn in a frame buffer. When the polygon group 702 placed at the back side is processed after the polygon group 701, the Z value of the polygon group 702 is not written to the Z-buffer since a Z value, which is smaller than the Z value of the polygon group 702, is already written to the Z-buffer. The polygon group 702 is not drawn in the frame buffer. In this case, as illustrated in FIG. 1C, the polygon group 701 placed at the front side is displayed on a display screen and the polygon group 702 placed at the back side is not displayed on the display screen.

However, when the transparency of the object is changed, the following problem occurs. As illustrated in FIG. 1D, when the rate of change of transparency is 80%, the current α value of the polygon group 701 placed at the front side is 56, which is lower than 60 of the writing threshold, and the current α value of the polygon group 702 placed at the back side is 64, which is higher than 60 of the writing threshold.

When the polygon group 701 placed at the front side is processed before the polygon group 702 placed at the back side, the Z value of the polygon group 701, whose current α value is lower than the writing threshold, is not written to the Z-buffer. As a result, the polygon group 702 placed at the back side, whose current α value is higher than the writing threshold, is drawn in the frame buffer. In this case, as illustrated in FIG. 1D, the polygon group 702, which exists at the back side, is displayed at the front side of the polygon group 701 on the display screen.

In order to solve the above problem, it can be considered that all polygons that form a drawing object are sorted in order of decreasing distance from the position of the viewpoint and that the respective polygons are processed in the order in which these polygons are sorted to draw each polygon in the frame buffer. However, sort processing increases an amount of calculations with at least the square order of the number of polygons. In the video game, since an image must be drawn for one frame time, sort processing cannot be completed for one frame when many polygons are processed. When the number of polygons that form the object is reduced, an image of the object displayed on the display screen becomes angular and unnatural.

In order to solve the above problem, there is a technique that determines whether the polygon that is projected on a virtual screen is a surface side or a back surface side and only the polygon determined as being the surface side is written to the frame buffer so that the polygon hidden behind the back surface side is displayed on the display screen. However, extremely large amounts of processing are required to determine whether the surface side or the back surface side is projected on the virtual screen in connection with all polygons.

SUMMARY OF THE INVENTION

An object of the present invention is to provide an image drawing apparatus that is capable of drawing a suitable image with a small amount of processing when an object, including multiple polygons, changes transparency.

In order to attain the above object, an image drawing apparatus according to a first aspect of the present invention draws an object, which includes multiple polygons and has a changing transparency, in a frame buffer with reference to a Z-buffer. The image drawing apparatus includes a change rate setting section that sets a transparency change rate of the object. The image drawing apparatus further includes a threshold setting section that sets a transparency threshold used for determining whether a Z value of a view coordinate system should be written to the Z-buffer according to the set change rate in connection with each pixel where each of the multiple polygons is perspective-transformed from a viewpoint and projected on a virtual screen.

The image drawing apparatus further includes a Z value calculating section that calculates the Z value of each pixel projected on the virtual screen in connection with each of the multiple polygons. The image drawing apparatus further includes a transparency calculating section that calculates transparency of each pixel projected on the virtual screen according to the set change rate. The image drawing apparatus further includes a transparency comparing section that compares the calculated transparency of each pixel with the set transparency threshold.

The image drawing apparatus further includes a Z-buffer writing section that writes the calculated Z value of the pixel, when the transparency is lower than the transparency threshold, to the Z-buffer. The image drawing apparatus further includes an image writing section that writes image data of each pixel projected on the virtual screen to the frame buffer with reference to the Z value of each pixel written to the Z-buffer. The image drawing apparatus further includes a display control section that causes a display section to display an image corresponding to image data written to the frame buffer.

In the image drawing apparatus, the transparency threshold used for determining whether the Z value of each pixel where each polygon is projected on the virtual screen should be written to the Z-buffer is set according to the transparency change rate of the object. Accordingly, even if the transparency change rate of the object is set to any value, the relationship in size between the transparency of each pixel in the change rate and the transparency threshold in the change rate can be fixed. For example, in the case where two polygons are projected on the same pixel on the virtual screen, whether the Z value of the same pixel of the polygon placed at the front surface (near the viewpoint) is written to the Z-buffer at the time of processing the polygon placed at the back surface (far from the viewpoint) is always fixed regardless of setting of the transparency change rate and regardless of whether the polygon placed at the front surface or the polygon placed at the back surface should be first processed.

As to whether image data, which is finally written to the frame buffer, is data of the polygon placed at the front surface or data of the polygon placed at the back surface, this is always fixed regardless of whether the polygon placed at the front surface or the polygon placed at the back surface should be first processed. Since there is no need to process the polygon placed at the back side first, the multiple polygons do not have to be sorted according to the Z value. Accordingly, the aforementioned image drawing apparatus can draw a suitable image with a small amount of processing regardless of the order in which the polygons that form the object are processed even when the object whose transparency changes is drawn.

The object used in the aforementioned image drawing apparatus is an object that includes multiple polygons whose transparency change rate is uniformly fixed with an arbitrary timing, and this has no relation with the form recognized by the user. For example, regarding the characters in the video game, the respective parts including a body, a head, hands and legs are recognized as one form by the user. When the transparency change rate of each portion is uniformly fixed, the entire character can be applied to the object of the present invention. When the transparency change rate is different for each portion, only the portion where the transparency change rate is uniformly fixed can be applied to the object of the present invention.

In order to attain the above object, an image drawing apparatus according to a second aspect of the present invention draws an object, which includes multiple polygons and has a changing transparency, in a frame buffer with reference to a Z-buffer. The image drawing apparatus includes a program memory that stores a program, a data memory that stores data, and a processor that executes the program. The data memory includes the Z-buffer and the frame buffer.

The program causes the processor to set a transparency change rate of the object. The program further causes the processor to set a transparency threshold used for determining whether a Z value of a view coordinate system should be written to the Z-buffer according to the set change rate in connection with each pixel where each of the polygons is perspective-transformed from a viewpoint and projected on a virtual screen.

The program further causes the processor to calculate the Z value of each pixel projected on the virtual screen in connection with each of the polygons. The program further causes the processor to calculate transparency of each pixel projected on the virtual screen according to the set change rate. The program further causes the processor to compare the calculated transparency of each pixel with the set transparency threshold. The program further causes the processor to write to the Z-buffer the calculated Z value of the pixel when the transparency is lower than the transparency threshold. The program further causes the processor to write image data of each pixel projected on the virtual screen to the frame buffer with reference to the Z value of each pixel written to the Z-buffer. The program further causes the processor to output an image signal corresponding to image data written to the frame buffer.

The program stored in the program memory of the image drawing apparatus according to the second aspect of the present invention can be recorded on a computer-readable storage medium. The computer-readable storage medium may be a storage medium constructed to be movably loaded on the computer apparatus and provided separately from the computer apparatus. The computer-readable storage medium may be a storage medium such as a fixed disk device that is included in the computer apparatus and provided together with the computer apparatus. In the program stored in the program memory of the image drawing apparatus according to the second aspect of the present invention, the data signal can be superimposed on a carrier wave from a server apparatus existing on a network and the result is distributed via the network.

In order to attain the above object, the image drawing method according to a third aspect of the present invention draws an object, which includes multiple polygons and has a changing transparency, in a frame buffer with reference to a Z-buffer. The image drawing method sets a transparency change rate of the object. The image drawing method further sets a transparency threshold used for determining whether a Z value of a view coordinate system should be written to the Z-buffer according to the set change rate in connection with each pixel where each of the polygons is perspective-transformed from a viewpoint and projected on a virtual screen.

The image drawing method further calculates the Z value of each pixel projected on the virtual screen in connection with each of the polygons. The image drawing method further calculates transparency of each pixel projected on the virtual screen according to the set change rate. The image drawing method further compares the calculated transparency of each pixel with the set transparency threshold. The image drawing method further writes to the Z-buffer the calculated Z value of the pixel when the transparency is lower than the transparency threshold. The image drawing method further writes image data of each pixel projected on the virtual screen to the frame buffer with reference to the Z value of each pixel written to the Z-buffer. The image drawing method further outputs an image signal corresponding to image data written to the frame buffer.

BRIEF DESCRIPTION OF THE DRAWINGS

FIG. 2 is a block diagram illustrating a configuration of a video game apparatus, according to an embodiment of the present invention;

FIG. 5 is a view illustrating an example of a model data table stored for each object to be displayed;

FIG. 6 is a view illustrating an example of a texture table stored for each texture of FIG. 5;

FIG. 7 is a view illustrating an example of a display object table for registering an object to be displayed in each frame;

DETAILED DESCRIPTION OF PREFERRED EMBODIMENTS

Figure 1A:
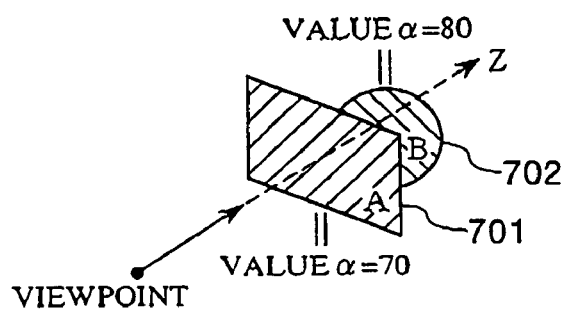
FIGS. 1A to 1D are views each illustrating processing according to a Z-buffer method at the time of drawing an object whose transparency changes according to a conventional example.

Embodiments of the present invention will be specifically described with reference to the drawings.

An explanation is given of a case as an embodiment of the present invention in which an object, whose transparency changes, exists in a virtual three-dimensional space and is drawn in a video game.

FIG. 2 is a block diagram illustrating a configuration of a video game apparatus 100 for executing the video game according to an embodiment of the present invention. As illustrated in the figure, the video game apparatus 100 is mainly constructed to include a video game main body 101. The video game main body 101 includes a control section 103, a RAM (Random Access Memory) 105, a hard disk drive (HDD) 107, a sound processor 109, a graphics processor 111, a DVD/CD-ROM drive 113, a communications interface 115, and an interface section 117, which are connected to an internal bus 119.

The sound processor 109 is connected to a sound output device 125, which is a speaker, and the graphics processor 111 is connected to a display device 121 having a display screen 122. A storage medium (DVD-ROM or CD-ROM) 131 can be attached to the DVD/CD-ROM drive 113. The communications interface 115 is connected to a network 151. An input section (controller) 161 and a memory card 162 are connected to the interface section 117.

The control section 103 includes a CPU (Central Processing Unit), a ROM (Read Only Memory), etc., and executes a program stored on the HDD 107 or the storage medium 131 to control the video game apparatus 100. The control section 103 has an internal timer and functions to cause the CPU to generate timer interruption according to time counted by the internal timer. As timer interruption, there is interruption, which is generated for each frame time. The RAM 105 is a work area for the control section 103. The HDD 107 is a storage area for storing a program and data In the case where a program executed by the control section 103 instructs the sound processor 109 to output a sound, the sound processor 109 interprets the instruction and outputs a sound signal to the sound output device 125.

The graphics processor 111 develops an image onto the frame memory (frame buffer) 112 (which is drawn outside of the graphics processor 111 in the figure but usually provided in a RAM included in a chip that forms the graphics processor 111) and outputs a video signal, which displays the image on the display screen 122 of the display device 121 according to a drawing command output from the control section 103. The graphics processor 111 has a Z-buffer for drawing an image in the RAM.

It is assumed that one frame time of the image included in outputting the video signal is, for example, 1/30 sec. The graphics processor 111 draws one image in one frame (namely, 1/30 sec.). Only one frame memory 112 is provided for each frame and the number of frame memories 112, which corresponds to two frames, is prepared. When outputting image data developed onto one frame memory, an image is developed onto the other frame memory. Only one Z-buffer is provided in common to the respective frames. In the graphics processor 111, a threshold of transparency is set to determine whether a Z value of a semi-transparent polygon should be written to the Z-buffer.

The DVD/CD-ROM drive 113 reads the program and data from the storage medium 131. The communications interface 115 is connected to the network 151 to perform communications with other computers. The interface section 117 outputs input data sent from the input section 161 to the RAM 105. The control section 103 interprets it to carry out arithmetic processing.

The input section 161 includes a directional key and multiple operation buttons. The directional key is used to move a player character in the game. Each operation button is used to instruct an operation of the player character. The interface section 117 forwards data, indicative of the progress of the game stored in the RAM 105, to the memory card 162 based on the instruction from the control section 103. The interface section 117 reads data of the game at the time of interruption from the memory card 162 and transfers the read data to the RAM 105 based on the instruction from the control section 103.

The program and data for performing the game by the video game apparatus 100 are first stored on, for example, the storage medium 131. The program and data are read by the DVD/CD-ROM drive 113 and loaded onto the RAM 105 at the time of execution. The control section 103 processes the program and data loaded onto the RAM 105, outputs a drawing command to the graphics processor 111, and outputs an instruction of a sound output to the sound processor 109. Intermediate data is stored in the RAM 105 while the control section 103 performs processing.

In the video game according to this embodiment, all characters including the player character move on a field formed in a virtual three-dimensional space. All characters do not always exist on the field. There is a character that fades in and appears on the field. There is a character that fades out and leaves the field. As a character that fades in and appears, there is an enemy character that appears when, for example, a battle with the player character is started. As a character that fades out and leaves, there is a character that can not move when, for example, an HP (residual damage value) reaches 0 in the battle.

Positions of objects (including characters) existing on the virtual three-dimensional space where a game field is formed are shown by coordinates of a world coordinate system. Each object includes multiple polygons, and a position of each polygon is shown by coordinates of a local coordinate system fixed for each object. An α value indicating transparency (the higher the transparency is, the lower the value becomes) is preset to each polygon. The object fades-in/fades-out by changing the rate of change of the α value. A current α value of each polygon in the process of fade in/fade out is one that is obtained by multiplying the preset α value by the rate of change of the α value (the rate of change of transparency).

The polygons where transparency changes concurrently, namely, the rates of change of the α value are always the same, form an object to be processed in the present embodiment. The operational form of the character including parts such as a body, a head, hands, legs changes as one body. In the case where the rate of change of the a value is fixed for each part at the time of fading in/fading out, each part is applied as an object. The following explains an object applied to the video game according to the present embodiment using an example of a character whose transparency changes with all parts.

Figure 3:
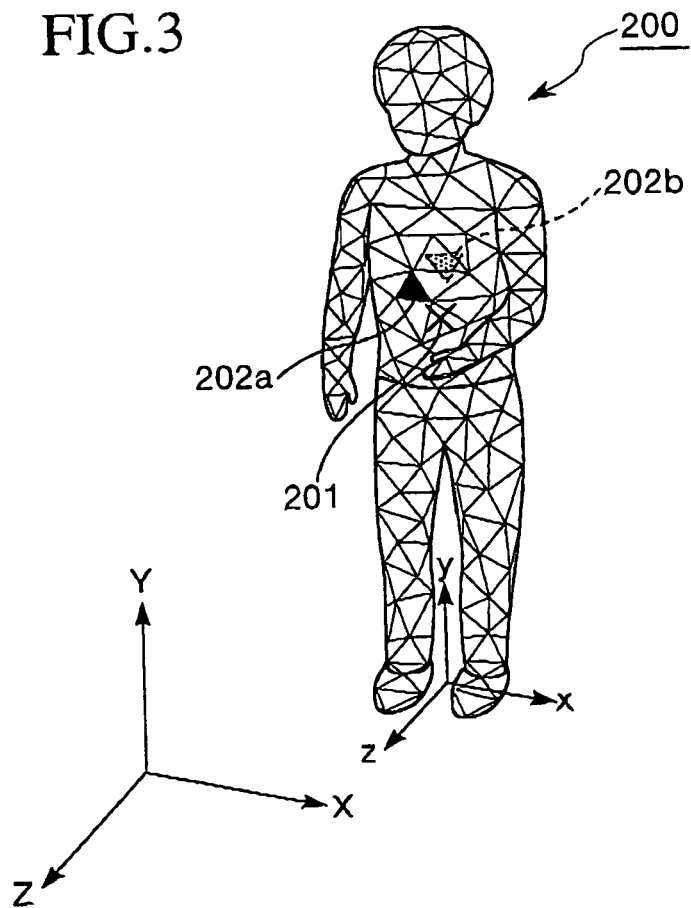
FIG. 3 is a view illustrating a configuration example of an object (character) that is drawn in a video game, according to an embodiment of the present invention.

FIG. 3 is a view illustrating an example of a character applied to the video game according to the present embodiment. A virtual three-dimensional space where a character 200 exists is shown by a world coordinate system (X, Y, Z). In the video game according to the present embodiment, a character having the same configuration as illustrated in FIG; 3 appears on a game scene (appears in the virtual three-dimensional space) and leaves the game scene (disappears from the virtual three-dimensional space) by establishment of a predetermined condition such as occurrence of an event. When the character appears on the game scene, there is a case in which fade-in processing is performed. When the character leaves the game scene, there is a case in which fade-out processing is performed.

As illustrated in FIG. 3, the character 200 is formed of multiple polygons including polygons 202a and 202b, and a vertex position of each polygon is shown by a local coordinate system (x, y, z). As described later, there is prepared model data that fixes the vertex position of the polygon for each object such as character 200. The position of the character 200 is shown by coordinates of a central point 201 formed at a substantially central position of the character 200 in the world coordinate system. The direction of the character 200 is expressed by an angle formed by each coordinate axis of the local coordinate system to each coordinate axis of the world coordinate system.

At the time of performing perspective-transformation processing, to be explained next, the coordinates of the local coordinate system of the vertex position of each polygon of the character 200 are transformed to the coordinates of the world coordinate system. The polygons 202a and 202b are placed at opposing positions that sandwich the central point 201 therebetween. There is a case in which one of the polygons 202a and 202b hides at least a part of the other polygon depending on a position of a viewpoint of a virtual camera to be explained next.

Figure 4:
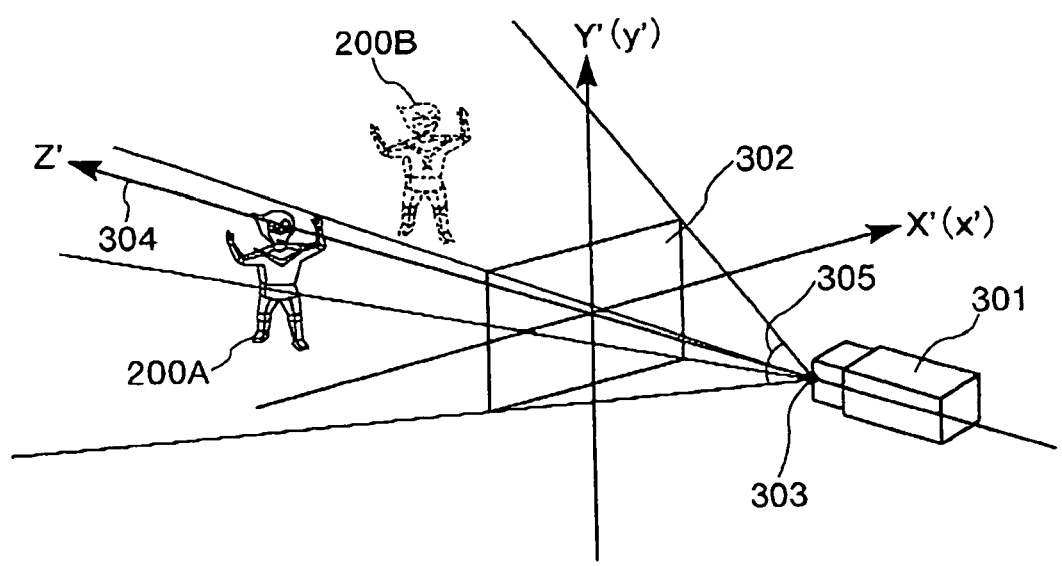
FIG. 4 is a view schematically illustrating perspective-transformation in a virtual three-dimensional space including the object (character) of FIG. 3.

The progress of the game such as a state where each character, e. g., the character 200 shown in FIG. 3, appears on the game scene or leaves the game scene is projected on the display screen 122 by perspective-transforming the virtual three-dimensional space using the virtual camera to be recognized by a player. FIG. 4 schematically illustrates the perspective-transformation. A virtual camera 301 is placed in the virtual three-dimensional space and an image projected on a virtual screen 302 becomes an image to be displayed on the display screen. An area, which includes a viewpoint 303 corresponding to the position of the virtual camera 301, a visual axis 304 corresponding to the direction of the virtual camera 301, and four straight lines formed by connecting the viewpoint 303 to four corners of the virtual screen 302, becomes a field of view 305.

The coordinate system, which is used to project the image on the virtual screen 302 in this way, is a view coordinate system (X', Y', Z'), and the direction of the visual axis 304 becomes a Z'-axis of the view coordinate system. A value of the Z'-coordinates increases according to an increase in distance from the viewpoint 303. The coordinate system on the virtual screen 302 is a screen coordinate system (x', y', z'). The directions of the x'-axis and y'-axis of the screen coordinate system are the same as the directions of the X'-axis and Y'-axis of the view coordinate system. The coordinates of the world coordinate system (including coordinates transformed from the coordinates of the local coordinate system) are transformed to the coordinates of the view coordinate system and further transformed to the coordinates of the screen coordinate system by perspective-transformation processing.

At the time of performing perspective-transformation to draw an image in the frame memory 112, hidden surface removal processing and texture mapping are carried out. A Z-buffer method is applied as the hidden surface removal processing. In FIG. 4, a character 200A whose transparency is unchanged and a character 200B whose transparency changes exist in the virtual three-dimensional space. Different processing is applied to the characters 200A and 200B at the time of performing the Z-buffer method and texture mapping. The details on this point will be described later.

An explanation is next given of various kinds of data applied to the video game according to the present embodiment. Hereinafter, an explanation is given of data necessary for making the object, such as the character 200, appear/disappear on/from the game scene to perspective-transform the state to be displayed on the display screen 122. Such data includes a model data table that registers model data of the object, a texture table that registers data of texture to be mapped, and a display object table that registers a displaying object, which exists in the virtual three-dimensional space at the present time.

FIG. 5 is a view illustrating an example of the model data table. A model data table 400 is a table that registers model data for each object, and is prerecorded on the storage medium 131. The model data table 400 may be transferred to the HDD 107. As illustrated in the figure, the model table 400 includes an object ID 401 for uniquely recognizing the object.

Polygon data 411, 421 . . . that form the object including polygon identification numbers 411a, . . . and vertex coordinates 411b, 421b, . . . , and texture data 412, 422 . . . including textures Nos. 412a, 422a, . . . and UV coordinates

412b, 422b, ... (corresponding to vertex coordinates 411b, 421b, ... ) is registered in the object data table 400.

The polygon identification numbers 411a, 421a, ... and texture Nos. 412a, 422a, ... are those that uniquely identify the respective polygons and the corresponding textures. Regarding the vertex coordinates 411b, 421b, ... and the UV coordinates 412b, 422b, ... , the vertex position of each polygon is shown by coordinates of the local coordinate system of the object. In the case of the object whose position and form are unchanged according to the progress of the game, the vertex coordinates 411b, 421b, ... and the UV coordinates 412b, 422b, ... may be shown by the coordinates of the world coordinate system. In the case where the vertex coordinates 411b, 421b, ... and the UV coordinates 412b, 422b, ... are shown by the coordinates of the world coordinate system, this fact must be registered in the object data table 400.

FIG. 6 is a view illustrating an example of the texture table. A texture table 500 is prepared for each texture registered in the model data table 400, and is prerecorded on the storage medium 131. The texture table 500 may be transferred to the HDD 107. As illustrated in the figure, UV coordinate data 510, 520, ... including texture No. 501, UV coordinates 511, 521, ... , RGB data 512, 522, ... , and α values 513, 523, ... are registered in the texture table 500.

The texture No. 501 corresponds to texture No. registered in the object table 400. The UV coordinates 511, 521, ... include UV coordinates registered in the object table 400 to correspond to the relevant texture No. RGB data 512, 522, ... are those that express a color in the coordinates by data of RGB, and the color in the polygon continuously changes according to these data. The α values 513, 523, ... show transparency in the coordinates. The higher the value is, the lower the transparency becomes, and the transparency in the polygon continuously changes.

FIG. 7 is a view illustrating an example of a display object table. A display object table 600 is a table that registers an object, which exists in the virtual three-dimensional space at the present time and is displayed on the display screen 122 according to the progress of the game. The display object table 600 is generated for each object to be displayed in each frame, and stored in the RAM 105. The display object table 600 of the object whose position, form, and transparency are unchanged may be prerecorded on the storage medium 131 and transferred to the RAM 105. Even if the object is registered in the display object table 600, the object is not displayed on the display screen 122 if the object does not exist in the range of the field of view 305.

As illustrated in the figure, an object ID 601, a kind of change 602, a rate of change of α value 603, and a display position 604 are registered in the display object table 600. One of the object IDs 401 of the model data table 400 is registered as the object ID 601. The kind of change 602 indicates whether the object is faded in or faded out. In the case where the object is displayed in a normal state, namely the object is neither faded in nor faded out, no information is registered as the kind of change 602.

The rate of change of α value 603 indicates a rate of change of transparency of the entire object. When the α value of the entire object is unchanged, the rate of change of α value 603 is 100%, and when the object becomes completely transparent, the rate of change of α value 603 is 0%. When the object fades in, the rate of change of α value 603 sequentially increases up to 100% from 0%. When the object fades out, the rate of change of α value 603 sequentially decreases to 0% from 100%. When nothing is registered in the kind of change 602 and the object is displayed in the normal state, the rate of change of α value 603 is 100%. The current α value of each polygon at the time of performing display processing is α value, which is obtained by multiplying the α value, which is fixed according to α values 513, 523, ... registered in the texture table 500, by the rate of change of α value 603. The display position 604 indicates the coordinates of the central point of the object in the world coordinate system.

In the case where the object registered in the display object table 600 is an object whose direction and form change according to the progress of the game as the character 200, data relating to the direction and form is required. In the case where the velocity of fade in/fade out is changed for each object, data relating to the velocity is required. The change in the direction and form of the object is not directly related to the present invention and the specific explanation is omitted.

When a new object appears on the game scene, a display object table 600 relating to the new object is generated. When the new object is an object that fades in, the kind of change 602 in the display object table 600 of the object is set to fade-in. The rate of change of α value 603 whose kind of change 602 is set to fade-in is increased from 0%. When the rate of change of α value 603 reaches 100%, setting of fade-in in the kind of change 602 is deleted.

When there is an object that fades out, the kind of change 602 in the display object table 600 of the object is set to fade-out. The rate of change of α value 603 whose kind of change 602 is set to fade-out is decreased from 100%. When the rate of change of α value 603 is decreased to 0%, the object completely disappears from the game scene, so that the display object table 600 of the object is deleted.

The following specifically explains the Z-buffer method applied as the hidden surface removal processing in the video game according to the present embodiment. The objects registered in the display object table 600 in each frame are processed in descending order of the Z'-coordinates of the display position 604 transformed from the world coordinate system by perspective-transformation, namely, in descending order of distance from the position of the viewpoint 303. In order to decide the order in which the objects are processed, sort processing is performed according to the Z'value of the display position 604. In connection with the objects to be processed, the rate of change of α value 603 registered in the display object table 600 is multiplied by a reference threshold (for example, 60) and a value obtained by dividing the multiplication result by 100 is set to a writing threshold.

Regarding the objects to be processed, the polygons registered in the model data table 400 are sequentially processed. Sort processing for deciding the order in which the polygons are processed is not carried out. The coordinates of the vertex of the processing polygon are transformed to the coordinates of the screen coordinate system by perspective-transformation. In connection with each pixel where the polygon is perspective-transformed to the screen coordinate system and projected on the virtual screen 302, the Z' value is calculated. Regarding the polygon, α values 513 and 523 registered in the texture table 500 are multiplied by the rate of change of α value 603 and a value obtained by dividing the multiplication result by 100 is calculated as a current α value. The current α value is calculated in connection with each pixel where the polygon is perspective-transformed to the screen coordinate system and projected on the virtual screen 302.

The Z' value of each pixel of the polygon is written to the Z-buffer when the Z' value is equal to or lower than a Z' value of the pixel of the polygon already registered in the Z-buffer and the current α value is higher than the writing threshold (namely, transparency of the pixel is lower than the writing threshold). When the Z' value of the pixel is written to the Z-buffer, image data of the pixel is drawn in the frame buffer (frame memory 112). Neither writing of the Z' value to the Z-buffer nor drawing of the image to the frame buffer is carried out, when the Z' value is higher than a Z' value of each pixel of the polygon already registered in the Z-buffer (namely, there are pixels of another polygon, each having the current α value higher than the writing threshold, at a location more forward than the pixels of the polygon). Though the Z' value is not written to the Z'-buffer, image data is drawn into the frame buffer when the Z' value is equal to or lower than a Z' value of each pixel of the polygon already registered in the Z-buffer and the current α value is equal to or lower than the writing threshold (namely, transparency of the pixel is greater than the threshold).

The following explains processing in the video game according to the present embodiment. In order to simplify the explanation, description of processing not particularly relating to the present invention is omitted in some cases. Processing of the control section 103 described in the following explanation actually includes processing that is executed by the graphics processor 111 based on the instruction from the control section 103 in some cases.

Figure 8:
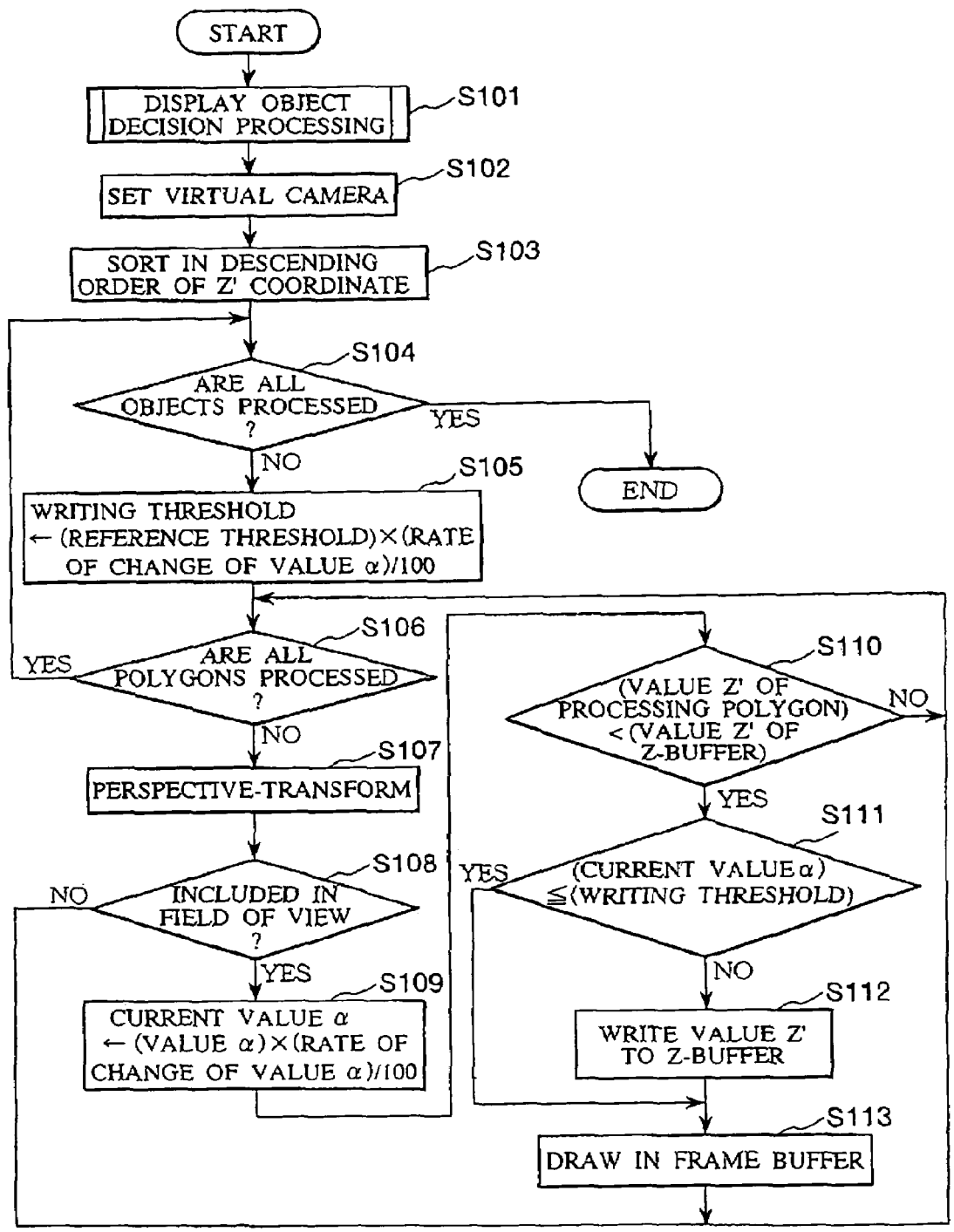
FIG. 8 is a flowchart illustrating object drawing processing executed by a video game apparatus, according to an embodiment of the present invention.

FIG. 8 is a flowchart illustrating exemplary object drawing processing executed in each frame in the video game. The object drawing processing is executed by timer interruption that is generated by the CPU using the internal timer of the control section 103 for each frame time. The object drawing processing is ended within one frame time. The frame memory 112 used in the explanation of this flowchart is one of two frame memories which is alternately changed for each frame time.

Figure 9:
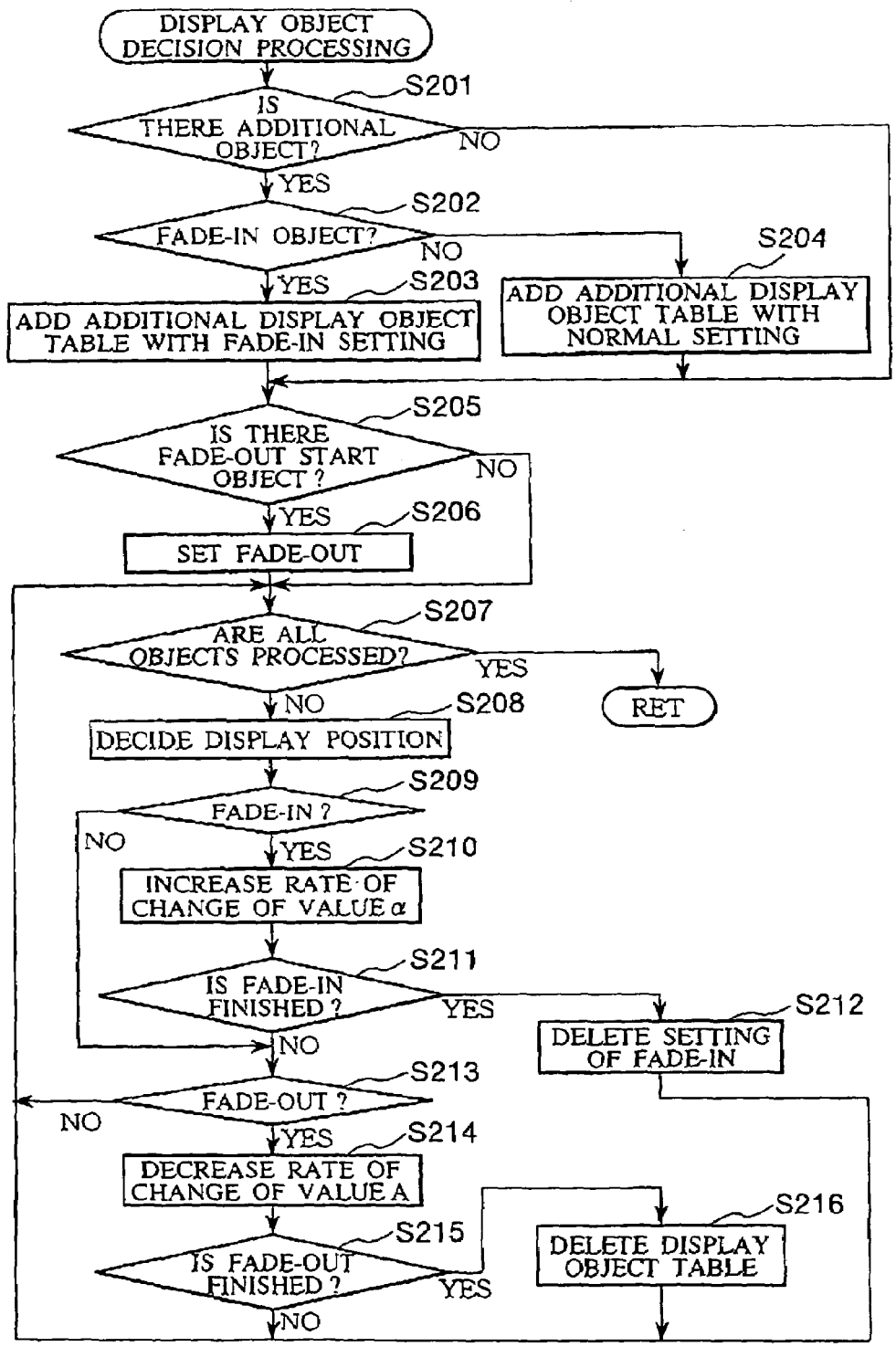
FIG. 9 is a flowchart specifically illustrating exemplary display object decision processing of FIG. 8.

In the object drawing processing, display object decision processing for deciding a processing object is carried out according to the progress of the game at the present time (step S100). FIG. 9 is a flowchart specifically illustrating exemplary display object decision processing of step S101.

In the display object decision processing, the control section 103 determines whether there is an object, which is newly processed in this frame time according to the progress of the game (step S201). When there is not a newly processed object, the processing flow directly goes to processing in step S205.

When there is a newly processed object, the control section 103 determines whether the object is an object that fades in and appears in the virtual three-dimensional space (step S202). When there is an object that fades in, the control section 103 sets in the display object table 600 fade-in as the kind of change 602 in the RAM 105 (step S203). When there is no object that fades in, the control section 103 sets in the display object table 600 nothing as the kind of change 602 in the RAM 105 (step S204). After processing in steps S203 and S204, the processing flow goes to processing in step S205.

In step S205, the control section 103 determines whether there is an object that newly starts to fade-out according to the progress of the game. When there is no object that newly starts to fade-out, the processing flow directly goes to processing in step S207. When there is an object that newly starts to fade-out, the control section 103 sets fade-out as the kind of change 602 in the display object table 600 of the object (step S206). Then, the processing flow goes to processing in step S207.

In processing in step S207 and afterward, the respective display object tables 600 stored in the RAM 105, namely, corresponding to the respective objects that appear on the game scene, are sequentially processed. In step S207, the control section 103 determines whether processing is ended in connection with all display object tables 600.

When there is a display object table 600 that is not yet processed, the control section 103 uses a display object table 600, which is registered after the display object tables 600 processed so far or a display object table 600 first registered when processing of this step is first performed, as a new processing display object table 600. The control section 103 decides a display position of an object corresponding to the new processing display object table 600, and registers the result as a display position 604 in the display object table 600 (step S208). In the case of the object whose direction and form are changed as in the character 200, the direction and form are also decided. In the case of the object whose display position, direction, and form are unchanged, there is no need to carry out processing in step S208.

The control section 103 determines whether fade-in is set as the kind of change 602 in the processing display object table 600 (step S209). When fade-in is not set as the kind of change 602, the processing flow directly goes to processing in step S213. When fade-in is set as the kind of change 602, the control section 103 increases the rate of change of α value 603, which is set in the display object table 600, by a predetermined amount (step S210).

The control section 103 determines whether the rate of change of α value 603 reaches 100% as a result of increasing the rate of change of α value 603, namely, whether the fade-in of the object is finished (step S211). When the fade-in of the object is not finished, the processing flow directly goes to processing in step S213. When the fade-in of the object is finished, the control section 103 deletes setting of fade-in as the kind of change 602 from the processing display object table 600 (step S212). Then, the processing flow returns to processing in step S207.

In step S213, the control section 103 determines whether fade-out is set as the kind of change 602 of the processing display object table 600. When fade-out is not set, the processing flow directly returns to step S207. When fade-out is set, the control section 103 decreases the rate of change of α value 603, which is set in the display object table 600, by a predetermined amount (step S214).

The control section 103 determines whether the rate of change of α value 603 reaches 0% as a result of decreasing the rate of change of α value 603, namely, whether the fade-out of the object is finished (step S215). When the fade-out of the object is not finished, the processing flow directly returns to processing in step S207. When the fade-out of the object is finished, the control section 103 deletes the processing display object table 600 from the RAM 105 (step S216). Then, the processing flow returns to processing in step S207.

In step S207, when determining that there is no display object table 600 which is not yet processed, the control section 103 ends display object decision processing and returns to the object drawing processing in FIG. 8.

Returning to the object display processing of FIG. 8 to continue the explanation, the control section 103 decides a position of the viewpoint 303 of the virtual camera 301, a direction of the visual axis 304, and a position of the virtual screen 302 according to the progress of the game (step S102). When the virtual camera 301 is fixed, there is no need to carry out processing in step S102.

The control section 103 transforms the coordinates of the world coordinate system shown by the display positions 604 of all objects registered in all display object tables 600 to the coordinates of the view coordinate system according to the position of the viewpoint 303 and the direction of the visual axis 304 decided in step 5102. The control section 103 sorts all objects (the display object tables 600 in RAM 105) in descending order of the Z'-coordinates of the view coordinate system, namely, in descending order of distance from the position of the viewpoint 303 (step S103).

In processing in step S104 and afterward, the objects sorted in step S103 are processed. An object, whose display position 604 is not included in the range of the field of view 305, or a predetermined range that is fixed a little more widely than the field of view 305, can be excluded from the processing objects. In step S104, the control section 103 determines whether processing of all objects is ended.

When there is an object that is not yet processed, the control section 103 multiplies a predetermined reference threshold by the rate of change of α value 603 registered in the display object table 600 of the processing object and sets a value, obtained by dividing the multiplication result by 100 to a writing threshold, to the Z-buffer (step S105).

In processing in step S106 and afterward, the respective polygons of the processing object registered in the model data table 400 are sequentially processed. In step S106, the control section 103 determines whether the processing of all polygons of the object is finished.

When there is a polygon that is not yet processed, the control section 103 performs processing of perspective-transformation where the coordinates of the local coordinate system of the polygon are transformed to the coordinates of the world coordinate system, the result is further transformed to the coordinates of the view coordinate system, and the result is further transformed to the coordinates of the screen coordinate system. The control section 103 calculates the Z' value in connection with each pixel where the processing polygon is perspective-transformed to the screen coordinate system and projected on the virtual screen 302 (step S107). According to the processing result of perspective-transformation, the control section 103 determines whether at least a part of the processing polygon is included in the range of the field of view 305, namely, whether at least a part of the processing polygon is projected on the virtual screen 302 (step S108). When the entirety of the polygon is not included in the range of the field of view 305, the processing flow returns to processing in step S106.

When at least a part of the polygon is included in the range of the field of view 305, the control section 103 multiplies α values 513 and 523 registered in the texture table 500 of the polygon by the rate of change of α value 603 of the object including the polygon, and divides the multiplication result by 100 to obtain a current α value. The current α value is obtained in connection with each pixel included in the polygon (step S109).

The control section 103 determines whether the Z' value of at least one of pixels of the processing polygon is smaller than the Z' value, which is already written in the Z-buffer at the corresponding coordinate position in the screen coordinate system (step S110). At the time of projecting the processing polygon on the virtual screen 302, when the Z' values of all pixels of the processing polygon are the same as or greater than the Z' value already written in the same pixel position of the Z-buffer, the processing flow goes back to processing in step S106.

At the time of projecting the processing polygon on the virtual screen 302, when the Z' values of at least one pixel are smaller than the Z' value written in the Z-buffer, the control section 103 determines whether all current α values calculated in step S109 are the same as or less than the writing threshold calculated in step S510 (step S111). When all current α values are the same as or less than the writing threshold, the processing flow directly goes to processing in step S113.

When there is at least one α value, which is larger than the writing threshold, the control section 103 newly writes the Z' value of the pixel, which is smaller than the Z' value already registered, in the Z-buffer (step S112). Then, the processing flow goes to processing in step S113. In step S113, the control section 103 writes image data of each pixel where the polygon is perspective-transformed and projected on the virtual screen 302 in the frame memory 112. Then, the processing flow returns to processing in step S106.

In step S106, when the control section 103 determines that processing of all polygons is finished, the processing flow returns to processing in step S104. In step S104, when the control section 103 determines that processing of all objects is finished, object drawing processing in the relevant frame is ended. When a next frame is started, object drawing processing is newly executed. In this case, the frame memory used in a next frame is different from that used in this frame.

In timer interruption for each frame time, image signal output processing is performed in parallel with the aforementioned object drawing processing. In image signal output processing, the control section 103 outputs an image output instruction to the graphics processor 111. The graphics processor 111 sequentially reads image data drawn in the frame memory 112 in the previous frame, adds a sync signal to generate a video signal, and outputs the generated video signal to the display device 121 based on the image output instruction from the control section 103. An image corresponding to the output video signal is displayed on the display screen 122 of the display device 121. When a next frame is started, image signal output processing is newly carried out. In this case, the frame memory used in a next frame is different from that used in this frame.

Figure 1B:
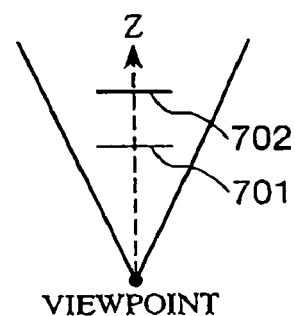
Figure 1C:
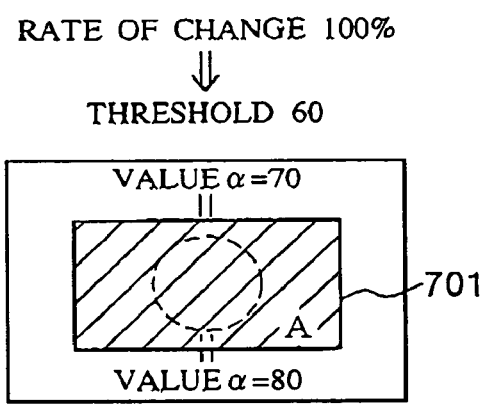
Figure 1D:
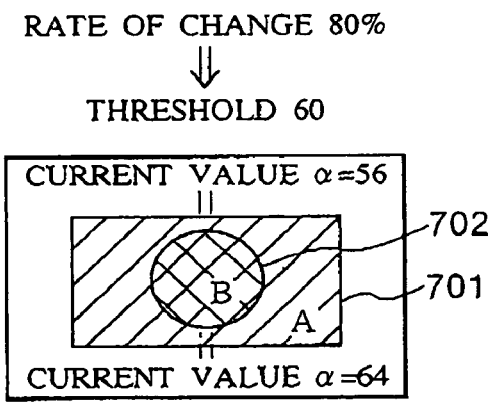
Figure 10A:
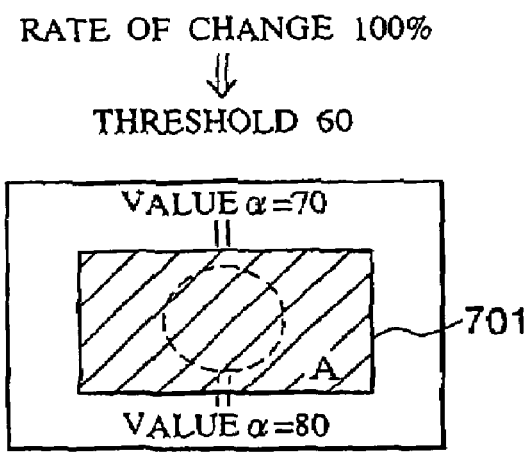
FIG. 10A and FIG. 10B are views each illustrating processing according to a Z-buffer method at the time of drawing an object whose transparency changes, according to an embodiment of the present invention.
Figure 10B:
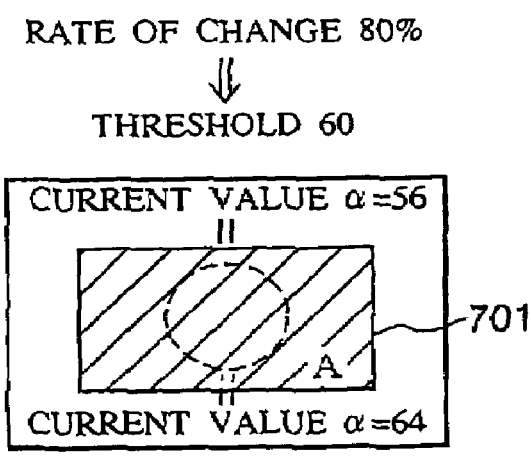

The following specifically explains processing according to the Z-buffer method at the time of drawing an object whose transparency changes in the video game according to the present embodiment. FIGS. 10A and 10B are views specifically explaining processing according to the Z-buffer method in the present embodiment. In this example, the polygons to be drawn are the same as those illustrated in FIGS. 1A and 1B, and it is assumed that the reference threshold is 60.

As illustrated in FIG. 10A, when transparency of the polygon groups 701 and 702 are unchanged, namely, the rate of change of the α value is 100%, the current α value of the polygon group 701 is 70×100/100=70 and the current α value of the polygon group 702 is 80×100/100=80. The writing threshold to the Z-buffer is set to 60×100/100=60.

When the polygon group 701 placed at the front side is first processed, the Z' value of the polygon group 701 is written to the Z-buffer since the current α value of the polygon group 701 is larger than the writing threshold. When the polygon group 702 placed at the back side is processed after the polygon group 701, image data of the polygon group 702 is not written to the Z-buffer since the Z' value, which is smaller than the Z' value of the polygon group 702, is already written in the Z-buffer. In this case, as illustrated in FIG. 10A, the polygon group 701 placed at the front side is displayed on the display screen and the polygon group 702 placed at the back side is not displayed on the display screen.

As illustrated in FIG. 10B, when transparency of the polygon groups 701 and 702 changes and the rate of change of the α value is 80%, the current α value of the polygon group 701 is 70×80/100=56 and the current α value of the polygon group 702 is 80×80/100=64. The writing threshold to the Z-buffer is set to 60×60/100=48.

When the polygon group 701 placed at the front side is first processed, the Z' value of the polygon group 701 is written to the Z-buffer since the current α value of the polygon group 701 is larger than the writing threshold. When the polygon group 702 placed at the back side is processed after the polygon group 701, image data of the polygon group 702 is not written to the Z-buffer since the Z' value, which is smaller than the Z' value of the polygon group 702, is already written in the Z-buffer. In this case, as illustrated in FIG. 10B, the polygon group 701 placed at the front side is displayed on the display screen and the polygon group 702 placed at the back side is not displayed on the display screen.

As explained above, in the video game according to the present embodiment, the writing threshold for deciding whether the Z' value of each polygon of the processing object is written to the Z-buffer is set according to the rate of change of the α value 603. The current α value of each polygon is also calculated according to the rate of change of the α value 603. For this reason, no matter how the rate of change of the α value 603 is set, the relationship in size between the writing threshold and the current α value of each polygon is constant.

Accordingly, even if the polygon placed at the front side is processed prior to the polygon placed at the back side, whether the Z' value of the polygon placed at the front side is written to the Z-buffer is fixed regardless of the rate of change of the α value 603 of the object including these polygons. Therefore, whether the image of the polygon placed at the back side should be drawn in the frame buffer is uniformly fixed regardless of the order in which the respective polygons are processed. This makes it possible to obtain the same result regardless of the order in which the respective polygons are processed and to display a suitable image on the display screen 122 at all times.

Since the same result can be obtained regardless of the order in which the respective polygons are processed, there is no need to sort the polygons that form an object. Though sort processing increases an amount of calculations with at least the square order of the number of polygons, processing for writing the Z' value of each polygon to the Z-buffer increases an amount of calculations with one power order of the number of polygons. Accordingly, even if the number of polygons that form the object increases, the amount of calculations does not increase so much. Therefore, the suitable image can be displayed on the display screen 122 with a small amount of calculations.

In the case where multiple objects to be displayed exist in the virtual three-dimensional space, sort processing is carried out for the objects based on the Z' value of the view coordinate system where the display position 604 of the objects are perspective-transformed. Unlike the number of polygons, the number of objects to be displayed is normally limited to a small number, so that the amount of calculations is not increased so much.

In the case where the multiple objects overlap with one another, the polygon of the object placed at the front side is positioned more forwardly than the polygon of the object placed at the back side in many cases. Regarding the polygons included in the different objects, when sort processing is carried out for objects, the polygon placed at the back side is processed prior to the polygon placed at the front side in many cases. Sort processing is carried out for objects to be displayed, so that an influence caused by the polygons each included in the different object can be kept to a minimum.

At the time of sequentially processing the multiple objects, a writing threshold for deciding whether the Z' value of each polygon that forms a predetermined processing object should be written to the Z-buffer for each object. For this reason, even when objects that fade in/fade out are mixed and the Rate of change of the α value 603 is different for each object, a suitable image of each object can be displayed on the display screen 122.

In the display object table 600, fade-in or fade-out is set as the kind of change 602. In this case, the rate of change of the α value 603 is changed by a predetermined amount for each frame. When the rate of change of the α value 603 is changed, the writing threshold is also changed. This makes it possible to uniformly fix whether the polygon placed at the back side should be displayed in any frame in the process of the fade-in or fade-out. Transparency changes of the object during the passage of time when the object is faded in or faded out can be displayed on the display screen 122 without a sense of discomfort.

The characters used in the video game are included as an object in which the writing threshold is changed according to a change in the rate of change of the α value 603. Since appearance or disappearance of the character on/from the game scene can be faded in or faded out using a suitable image, a sense of presence in the progress of the game is improved.

The number of frame buffers prepared in the video game apparatus 100 according to the present embodiment is only two, since reading of image data and developing of the image are alternately carried out. The number of Z-buffers is only one. This is because the Z' values of polygons are not necessary when reading an image developed in a frame buffer. Accordingly, since a minimum number of Z-buffers and a minimum number of frame buffers may be prepared, the necessary storage capacity can be reduced.

The present invention is not limited to the aforementioned embodiment and various modifications and applications may be possible. The following explains some modifications of the aforementioned embodiment, which are applicable to the present invention.

In the aforementioned embodiment, object drawing processing is performed for each frame to draw image data in the frame memory 112. In contrast to this, in the case where one frame is formed by two fields by interlace scanning, object drawing processing is performed for each field, so that image data may be drawn in the frame memory 112. In the case where the number of processing polygons is large, object drawing processing is performed every two frames, so that image data may be drawn in the frame memory 112. In this case, the same image is displayed on the display screen. 122 in two consecutive frames.

According to the aforementioned embodiment, in object drawing processing of FIG. 8, the objects are sequentially processed in descending order of distance from the position of the viewpoint 303 in unit of one object. In contrast to this, in the case where there are multiple objects that fade-in or fade-out simultaneously and have the same rate of change of the α value 603 in the same frame, these multiple objects may be processed at one time. In display object decision processing, processing for increasing or decreasing the rate of change of the α value 603 can be performed in connection with these multiple objects.

Instead of the fact that the writing threshold is obtained one object by one object, the following method may be performed. Namely, the rate of change of the α value, which is set in connection with the multiple objects to be processed concurrently, is multiplied by the reference threshold, and a value obtained by dividing the multiplication result by 100 can be set as a writing threshold of the multiple predetermined processing objects. Setting of the rate of change of the α value 603 and/or setting of the writing threshold is performed at one time, so that an amount of processing may be further reduced.

In the aforementioned embodiment, fade-in and fade-out are taken as an example for changing transparency of the object. However, an object whose transparency changes for other reasons, for example, an object whose transparency increases and decreases repeatedly can be used as a processing object in the present invention. In this case, a state of change is registered as the kind of change 602 in the display object table 600, and the rate of change of the α value 603 may be calculated according to the registered kind of change 602.

In the aforementioned embodiment, the video game apparatus 100, which is a special-purpose machine, is used as a platform. In contrast to this, any apparatus such as a general-purpose computer may be used if the apparatus includes the same structural components as those of the video game main body 101 and a function of drawing an image. Moreover, a portable video game apparatus, which contains the display device 121 and the sound output device 125 in the same cabinet as that of the video game main body 101, may also be used.

In the aforementioned embodiment, the program and data of the video game apparatus 100 are stored in the storage medium 131 and distributed. A semiconductor memory card can be used as the storage medium 131 in place of a DVD-ROM or CD-ROM. In this case, the computer apparatus applied as a platform can include a card slot for inserting the memory card instead of the DVD/CD-ROM drive 113. The program and data relating to the present invention may be prestored in the HDD 107. Regarding the storage medium for storing the program and data relating to the present invention, any storage medium may be used according to the physical form of hardware and the distribution thereof.

The programs and data relating to the present invention may be stored on a fixed disk apparatus provided in a Web server existing on the network 151. The Web server may convert the program and data stored in the fixed disk apparatus to a signal and superimpose the signal on a carrier wave, and distribute it to the video game main body 101 via the network 151. For example, the program and data, which the communications interface 115 receives from the Web server, can be stored in the HDD 107 and loaded to the RAM 105 at an executing time.

In the aforementioned embodiment, the explanation is given of the case in which the present invention is applied to the video game including the object whose transparency changes. As a matter of fact, the applicable range of the present invention is not limited to the video game. Namely, the present invention can be used in the general field of the computer graphics processing for drawing an image of an object whose transparency changes. A program including a function of drawing an image of the object whose transparency changes can be distributed by the aforementioned various kinds of methods as mentioned above regardless of whether the program is part of a video game Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An image drawing apparatus that draws an object, which includes multiple polygons and has a changing transparency, in a frame buffer with reference to a Z-buffer, comprising:
   a change rate setting section that sets a transparency change rate of the object;
   a threshold setting section that sets a transparency threshold used for determining whether a Z value of a view coordinate system should be written to the Z-buffer according to the set change rate in connection with each pixel where each of the multiple polygons is perspective-transformed from a viewpoint and projected on a virtual screen;
   a Z value calculating section that calculates the Z value of each pixel projected on the virtual screen in connection with each of the multiple polygons;
   a transparency calculating section that calculates transparency of each pixel projected on the virtual screen according to the set change rate;
   a transparency comparing section that compares the calculated transparency of each pixel with the set transparency threshold;
   a Z-buffer writing section that writes the calculated Z value of the pixel to the Z-buffer when the transparency is lower than the transparency threshold;
   an image writing section that writes image data of each pixel projected on the virtual screen to the frame buffer with reference to the Z value of each pixel written to the Z-buffer; and
   a display control section that causes a display to display an image corresponding to image data written to the frame buffer.

2. The image drawing apparatus according to claim 1,
   wherein said change rate setting section sets the transparency change rate of the object to be sequentially changed according to passage of time; and
   wherein said threshold setting section sets the transparency threshold every time the transparency change rate changes.

3. The image drawing apparatus according to claim 1, further comprising:
   a transparency change detecting section that detects whether the object is an object that changes transparency; and
   wherein said change rate setting section sets the transparency change rate of the object when the object is an object that changes transparency.

4. The image drawing apparatus according to claim 3, wherein the transparency change of the object comprises fade-in or fade-out.

5. The image drawing apparatus according to claim 1,
wherein the drawing object comprises multiple drawing objects;
wherein said change rate setting section sequentially processes each of the multiple objects and sets the transparency change rate of each object; and
wherein said threshold setting section sets the transparency threshold for each object according to the set transparency change rate of each object.

6. The image drawing apparatus according to claim 5,
wherein said change rate setting section concurrently processes the multiple objects that concurrently change their transparency change rate; and
wherein said threshold setting section sets the transparency threshold common to the concurrently processed multiple objects.

7. The image drawing apparatus according to claim 1, further comprising:
an object storing section that stores an object to be drawn; and
an object deleting section that deletes from said object storing section an object having the transparency change rate set to 0%.

8. The image drawing apparatus according to claim 1,
wherein said Z-buffer writing section writes the calculated Z value to the Z-buffer in connection with a pixel when the calculated Z value is smaller than the Z value already written to the Z-buffer and the calculated transparency is lower than the set transparency threshold; and
wherein said image writing section writes image data to the frame buffer in connection with the pixel when the calculated Z value is smaller than the Z value already written to the Z-buffer.

9. The image drawing apparatus according to claim 1,
wherein the drawing object comprises multiple drawing objects;
wherein said image drawing apparatus further comprises:
an object sorting section that sorts the multiple objects in descending order of distance from the viewpoint based on the Z value of a central point set in each object in the view coordinate system; and
a processing control section that causes said change rate setting section, said threshold setting section, said Z value calculating section, said transparency calculating section, said transparency comparing section, said Z-buffer writing section, and said image writing section to sequentially process each of the objects in the stored order.

10. The image drawing apparatus according to claim 1, further comprising:
a polygon storing section that stores multiple polygons that form the object; and
a processing control section that causes said Z value calculating section, said transparency calculating section, said transparency comparing section, said Z-buffer writing section, and said image writing section to sequentially process each of the polygons in the stored order.

11. The image drawing apparatus according to claim 1, wherein the object comprises a character that appears and disappears in a game scene when a predetermined condition is satisfied in a video game.

12. The image drawing apparatus according to claim 1, further comprising:
a processing control section that causes said change rate setting section, said threshold setting section, said Z value calculating section, said transparency calculating section, said transparency comparing section, said Z-buffer writing section, and said image writing section to execute every frame time or field time.

13. The image drawing apparatus according to claim 12,
wherein the number of prepared frame buffers is two, image data is written to one frame buffer alternately for each frame time or each field time, and the image is displayed by said display control section based on image data written to the other frame buffer;
wherein the number of prepared Z-buffers is one and the Z-buffer is used for both frame buffers for either frame time or field time.

14. An image drawing apparatus that draws an object, which includes multiple polygons and has a changing transparency, in a frame buffer with reference to a Z-buffer, comprising:
a program memory that stores a program; a data memory that stores data; and a processor that executes the program;
wherein said data memory comprises the Z-buffer and the frame buffer;
wherein the program causes said processor to execute:
setting a transparency change rate of the object;
setting a transparency threshold used for determining whether a Z value of a view coordinate system should be written to the Z-buffer according to the set change rate in connection with each pixel where each of the multiple polygons is perspective-transformed from a viewpoint and projected on a virtual screen;
calculating the Z value of each pixel projected on the virtual screen in connection with each of the multiple polygons;
calculating transparency of each pixel projected on the virtual screen according to the set change rate;
comparing the calculated transparency of each pixel with the set transparency threshold;
writing to the Z-buffer the calculated Z value of the pixel when the transparency is lower than the transparency threshold;
writing image data of each pixel projected on the virtual screen to the frame buffer with reference to the Z value of each pixel written to the Z-buffer; and
outputting an image signal corresponding to image data written to the frame buffer.

15. The image drawing apparatus according to claim 14,
wherein the program causes said processor to execute:
setting the transparency change rate of the object according to passage of time; and
setting the transparency threshold every time the transparency change rate changes.

16. The image drawing apparatus according to claim 14,
wherein the program causes said processor to execute:
detecting whether the object is an object that changes transparency; and
setting the transparency change rate of the object when the object changes transparency.

17. The image drawing apparatus according to claim 14,
wherein the program causes said processor to execute:
writing the calculated Z value to the Z-buffer in connection with the pixel when the calculated Z value is smaller than the Z value already written to the Z-buffer and the calculated transparency is lower than the set value; and
writing image data to the frame buffer in connection with the pixel when the calculated Z value is smaller than the Z value already written to the Z-buffer.

18. The image drawing apparatus according to claim 14, wherein said data memory includes an object storing area where multiple objects to be drawn are stored; and
wherein the program causes said processor to execute:
setting the transparency change rate of each of the multiple objects sequentially; and
setting the transparency threshold for each object according to the transparency change rate set in each of the multiple objects.

19. The image drawing apparatus according to claim 14, wherein said data memory includes an object storing area where multiple objects to be drawn are stored; and
wherein the program causes said processor to execute:
sorting the multiple objects in descending order of distance from the viewpoint based on the Z value of a central point set in each object in the view coordinate system; and
setting the transparency change rate, setting the transparency threshold, calculating the Z value, calculating the transparency, comparing the transparency, writing the Z value to the Z-buffer, and writing image data to the frame buffer for each of the objects in the sorted order.

20. The image drawing apparatus according to claim 14, wherein said data memory includes a polygon storing area where multiple polygons that form the object are stored; and
wherein the program causes said processor to execute:
calculating the Z value, calculating the transparency, comparing the transparency, writing the Z value to the Z-buffer, and writing image data to the frame buffer for each of the polygons in the stored order.

21. The image drawing apparatus according to claim 14, wherein the program causes said processor to execute:
causing said processor to generate timer interruption for each frame time or each field time; and
setting the transparency change rate, setting the transparency threshold, calculating the Z value, calculating the transparency, comparing the transparency, writing the Z value to the Z-buffer, and writing image data to the frame buffer in the timer interruption processing.

22. The image drawing apparatus according to claim 21, wherein two frame buffers are included in said data memory, image data is written to one of two frame buffers for each frame time or each field time, and the image signal is output to image data written to the other frame buffer; and
wherein only one Z-buffer is included in said data memory and the Z-buffer is shared for either frame time or field time.

23. An image drawing method for drawing an object, which includes multiple polygons and has a changing transparency, in a frame buffer with reference to a Z-buffer, comprising:
setting a transparency change rate of the object;
setting a transparency threshold used for determining whether a Z value of a view coordinate system should be written to the Z-buffer according to the set change rate in connection with each pixel where each of the multiple polygons is perspective-transformed from a viewpoint and projected on a virtual screen;
calculating the Z value of each pixel projected on the virtual screen in connection with each of the multiple polygons;
calculating transparency of each pixel projected on the virtual screen according to the set change rate;
comparing the calculated transparency of each pixel with the set transparency threshold;
writing to the Z-buffer the calculated Z value of the pixel when the transparency is lower than the transparency threshold;
writing image data of each pixel projected on the virtual screen to the frame buffer with reference to the Z value of each pixel written to the Z-buffer; and
outputting an image signal corresponding to image data written to the frame buffer.

24. A computer-readable storage medium that records a program for drawing an object, which includes multiple polygons and has a changing transparency, in a frame buffer with reference to a Z-buffer,
wherein the program causes a computer apparatus to execute:
setting a transparency change rate of the object;
setting a transparency threshold used for determining whether a Z value of a view coordinate system should be written to the Z-buffer according to the set change rate in connection with each pixel where each of the multiple polygons is perspective-transformed from a viewpoint and projected on a virtual screen;
calculating the Z value of each pixel projected on the virtual screen in connection with each of the multiple polygons;
calculating transparency of each pixel projected on the virtual screen according to the set change rate;
comparing the calculated transparency of each pixel with the set transparency threshold;
writing to the Z-buffer the calculated Z value of the pixel when the transparency is lower than the transparency threshold;
writing image data of each pixel projected on the virtual screen to the frame buffer with reference to the Z value of each pixel written to the Z-buffer; and
outputting an image signal corresponding to image data written to the frame buffer.

25. An image drawing method for drawing an object, which includes multiple polygons and has a changing transparency, in a frame buffer with reference to a Z-buffer, comprising:
setting a transparency change rate of the object;
setting a transparency threshold used for determining whether a Z value of a view coordinate system should be written to the Z-buffer according to the set change rate in connection with each pixel where each of the multiple polygons is perspective-transformed from a viewpoint position and projected on a virtual screen;
calculating the Z value of each pixel projected on the virtual screen in connection with each of the multiple polygons;
calculating transparency of each pixel projected on the virtual screen according to the set change rate;
comparing a calculated transparency of each pixel with a set transparency threshold;
writing to the Z-buffer the calculated Z value of the pixel when the transparency is lower than a transparency threshold;
writing image data of each pixel projected on a virtual screen to the frame buffer with reference to the Z value of each pixel written to the Z-buffer;
and outputting an image signal corresponding to image data written to the frame buffer.

* * * * *

UNITED STATES PATENT AND TRADEMARK OFFICE
CERTIFICATE OF CORRECTION

| | | |
|---|---|---|
| PATENT NO. | : 7,362,327 B2 | Page 1 of 1 |
| APPLICATION NO. | : 10/989281 | |
| DATED | : April 22, 2008 | |
| INVENTOR(S) | : Futoshi Katsuyama | |

It is certified that error appears in the above-identified patent and that said Letters Patent is hereby corrected as shown below:

Starting in column 22 lines 43-54 of the printed patent please DELETE "setting a transparency change rate of the object; setting a transparency threshold used for determining whether a Z value of a view coordinate system should be written to the Z-buffer according to the set change rate in connection with each pixel where each of the multiple polygons is perspective-transformed from a viewpoint position and projected on a virtual screen; calculating the Z value of each pixel projected on the virtual screen in connection with each of the multiple polygons; calculating transparency of each pixel projected on the virtual screen according to the set change rate;"

Signed and Sealed this

Twenty-sixth Day of May, 2009

JOHN DOLL
*Acting Director of the United States Patent and Trademark Office*